US008329610B2

(12) United States Patent
Gao et al.

(10) Patent No.: US 8,329,610 B2
(45) Date of Patent: Dec. 11, 2012

(54) HYDROGENATION CATALYST COMPOSITION, PROCESS FOR PREPARING THE SAME AND USE THEREOF

(75) Inventors: Yulan Gao, Fushun (CN); Xiangchen Fang, Fushun (CN); Gang Wang, Fushun (CN); Fenglan Cao, Fushun (CN); Chonghui Li, Fushun (CN); Guang Chen, Fushun (CN)

(73) Assignees: China Petroleum & Chemical Corporation, Beijing (CN); Fushun Research Institute of Petroleum and Petrochemicals, Sinopec Corp., Fushun (CN)

( * ) Notice: Subject to any disclaimer, the term of this patent is extended or adjusted under 35 U.S.C. 154(b) by 714 days.

(21) Appl. No.: 12/374,522

(22) PCT Filed: Nov. 14, 2006

(86) PCT No.: PCT/CN2006/003060
§ 371 (c)(1),
(2), (4) Date: Jul. 21, 2009

(87) PCT Pub. No.: WO2008/028348
PCT Pub. Date: Mar. 13, 2008

(65) Prior Publication Data
US 2009/0308790 A1      Dec. 17, 2009

(30) Foreign Application Priority Data

Jul. 21, 2006 (CN) .......................... 2006 1 0047283

(51) Int. Cl.
*B01J 31/18* (2006.01)
(52) U.S. Cl. ........ 502/167; 502/150; 502/168; 502/200; 502/219; 502/221; 208/111.3; 208/111.35
(58) Field of Classification Search .................. 502/151, 502/167, 168, 200, 219, 221, 222, 254, 258, 502/150, 162, 172, 216; 208/111.3, 111.35, 208/143, 289, 297
See application file for complete search history.

(56) References Cited

U.S. PATENT DOCUMENTS

| 4,530,917 | A | 7/1985 | Berrebi |
| 4,725,569 | A | 2/1988 | Tuszynski et al. |
| 4,943,547 | A | 7/1990 | Seamans et al. |
| 4,983,558 | A | 1/1991 | Born et al. |
| 5,017,535 | A | 5/1991 | Schoonhoven et al. |
| 5,215,954 | A | 6/1993 | Seamans et al. |
| 5,397,756 | A | 3/1995 | Dufresne et al. |
| 5,565,091 | A * | 10/1996 | Iino et al. .................. 208/216 R |
| 5,786,293 | A | 7/1998 | Lockemeyer |
| 5,821,191 | A | 10/1998 | Lockemeyer |
| 5,922,638 | A | 7/1999 | Dufresne et al. |
| 6,059,956 | A | 5/2000 | Dufresne |
| 6,077,803 | A | 6/2000 | Dufresne et al. |
| 6,417,134 | B1 | 7/2002 | Dufresne et al. |
| 2004/0055936 | A1 | 3/2004 | Diehl et al. |

FOREIGN PATENT DOCUMENTS

| CN | 1262305 | 8/2000 |
| CN | 1611577 | 5/2005 |
| CN | 1861256 | 11/2006 |
| CN | 1861760 | 11/2006 |
| EP | 0352851 | 1/1990 |
| JP | 2000325797 | 11/2000 |
| JP | 2003530208 | 10/2003 |
| JP | 2004034028 | 2/2004 |
| JP | 2004057848 | 2/2004 |
| JP | 2004344754 | 12/2004 |
| WO | 9425157 | 11/1994 |

OTHER PUBLICATIONS

IPCS Health and Safety Guide No. 103, White Spirit, WHO 1996, http://www.inchem.org/documents/hsg/hsg/hsg103.htm.*
PCT/CN2006/003060 International Search Report, dated Nov. 25, 2007, 3 pages.
Japanese Office Action for Application No. 2009-519778 dated Apr. 10, 2012 (Translation and Original, 6 pages).

* cited by examiner

*Primary Examiner* — Walter D Griffin
*Assistant Examiner* — Renee E Robinson
(74) *Attorney, Agent, or Firm* — Anova Law Group, PLLC; Allen (Zhi Yang) Xue (57) ABSTRACT

The present invention relates to a hydrogenation catalyst composition, process for preparing the same and use thereof. The composition comprises a hydrogenation catalyst, an organonitrogen compound in an amount of 0.01%-20% by weight of the catalyst, a sulfiding agent in an amount of 30%-150% by weight of the sulfur-requiring amount calculated theoretically of the hydrogenation catalyst, and an organic solvent in an amount of 0.1%-50% by weight of the catalyst. The preparation process comprises introducing the required substances onto the hydrogenation catalyst in oxidation state. By introduction of the organonitrogen compound, sulfur and organic solvent, the hydrogenation catalyst composition of the present invention may further increase the sulfur-maintaining ratio of the catalyst during the activation, slow down the concentrative exothermic phenomenon, decrease the rate of temperature rise of the catalyst bed layer, and improve the activity of the catalyst. The process of the present invention may be used for the treatment before the application of various hydrogenation catalysts.

27 Claims, 1 Drawing Sheet

HYDROGENATION CATALYST COMPOSITION, PROCESS FOR PREPARING THE SAME AND USE THEREOF

TECHNICAL FIELD

The present invention relates to a hydrogenation catalyst composition, process for preparing the same and use thereof. More specifically, the present invention concerns a sulfiding agent-containing hydrogenation catalyst composition, process for preparing the same and use thereof.

BACKGROUND ART

Generally, hydrogenation catalysts, such as hydrorefining catalyst, hydrotreating catalyst and hydrocracking catalyst comprise refractory oxides, such as alumina, silica-alumina, molecular sieve and the like, as the support, and one or more metals selected from the group consisting of molybdenum, tungsten, cobalt and nickel as the active metal components. Optionally, hydrogenation catalysts may contain auxiliary agent components, such as phosphorus, silicon, fluorine, titanium, zirconium, boron and so on. The metal components of the catalyst produced during the production process are usually present in an oxidation state. In the hydrogenation process, however, the active metal components of the catalyst have higher reaction properties when presenting in a sulfurization state (metals are present in the form of sulfides, such as $Co_9S_8$, $MoS_2$, $Ni_3S_2$, $WS_2$ and so on). The catalyst, thereby, needs to be presulfurized and converted to the sulfurization state thereof before being used. However, the presulfiding effects closely relate to the catalytic properties, and both the presulfiding process and the process control are essential.

In the prior art, there are merely two processes for presulfiding the hydrogenation catalyst, i.e. in situ presulfurization and ex situ presulfurization. In situ presulfurization is a process comprising feeding the catalyst into a reactor, and sulfiding by introducing a sulfiding agent, which is a common process. It has the disadvantage that the presulfurization lasts a long period of time, so as to have an adverse effect on the production efficiency. Ex situ presulfurization is a process in which the catalyst has been sulfurized or the sulfiding agent has been present before loading, and no introduction of a sulfiding agent occurs after loading the catalyst into the reactor. It has the advantage that the presulfurization lasts a short period of time, so as to improve the production efficiency.

Ex situ presulfurization concerns completely converting the metals on the catalyst to the sulfurization state thereof and then passivating; or adding a sulfiding agent before feeding the catalyst into the reactor, and then converting the active metals to the sulfurization state thereof in the reactor. Although it is easy to prepare, store, transport and feed by using said process, there are no sufficient interactions between the sulfiding agent and the catalyst metals, and the sulfiding agent easily loses and the concentrative thermal release readily occurs during the activation after the sulfiding agent-containing presulfiding catalyst is fed into the rector.

In the ex situ presulfurization of the hydrogenation catalyst, the sulfiding agent is generally selected from the group consisting of elemental sulfur, organic sulfides, inorganic sulfides, and mixtures thereof. Different addition methods and treatment methods will result in different presulfiding effects. Due to low cost and high utilization ratio, the elemental sulfur is used in many techniques as a sulfiding agent. When the elemental sulfur is used, it is usually introduced into the catalyst in the prior art by sublimation adsorption, melt impregnation, impregnation via dispersion in an organic solution, directly mixing with solid elemental sulfur powder, and the like.

U.S. Pat. No. 4,943,547 and U.S. Pat. No. 5,215,954 disclose adding elemental sulfur to an oil having a high boiling point or an organic solvent to produce a suspension beforehand, and then reacting with a fresh catalyst, or impregnating with an oil having a high boiling point or an organic solvent after the powdery elemental sulfur is contacted with the fresh catalyst. By said process, a certain sulfur-maintaining ratio may be achieved, but there is a problem of the concentrative heat release during the activation of the catalyst in the reactor. Moreover, the sulfur-maintaining ratio needs to be further improved. U.S. Pat. No. 6,077,803 describes dissolving the elemental sulfur and the organic sulfur in a solvent, and introducing elemental sulfur into the catalyst in the presence of a stabilizer selected from organic acids, thiols or organic alcohols, especially glycerine or hexose. But its disadvantage still lies in the problem of concentrative exothermic phenomenon.

In U.S. Pat. No. 5,786,293, U.S. Pat. No. 5,821,191 and EP352851, inorganic sulfides are as the sulfiding agent. The preparation process by dissolving the elemental sulfur in $(NH_3)_2S$ solution is usually used therein. Complicated operation is the main insufficiency. Impregnation needs to be conducted at least twice so as to achieve some certain sulfur-loading amount, and the last drying must be carried out under an inert atmosphere.

In U.S. Pat. No. 5,017,535, EP 329499, U.S. Pat. No. 4,725,569 and EP130850, thiols, dimethyl sulfides, carbon bisulfide, and other organic sulfides containing 1-20 carbon atoms are used as the sulfiding agent. The elemental sulfur and organic sulfur are used together as the sulfiding agent in U.S. Pat. No. 5,922,638 and U.S. Pat. No. 5,397,756. The application of organic sulfiding agent has the main problem of higher amount and price. In addition, there is also some certain problem in transportation and loading process.

CN1107539C discloses contacting hydrocarbon compounds with the catalyst, and ex situ presulfiding with hydrogen and sulfur-containing compounds. Due to the presence of hydrogen and higher temperature (330° C. in the examples), the sulfides decompose to produce hydrogen sulfide (in fact, hydrogen sulfide is directly used in said patent). Hydrogen sulfide reacts with the metals on the catalyst to produce the metal sulfides, which is a process of complete presulfurization of the catalyst. However, the presulfurized catalyst easily combusts spontaneously, and there is safety problem in storage, transportation and loading. CN1400056A describes coating a sulfiding agent-containing presulfiding catalyst with an oxygen-containing organic compound containing at least 16 carbon atoms, treating at a temperature higher than 175° C. for a certain period of time, and then activating with hydrogen so as to reduce the self-heating of the catalyst. However, said process does not completely solve the self-heating problem of the catalyst in sulfurization state, and there is still a certain problem in storage, transportation and loading of the catalyst. CN1262305A discloses a process for presulfiding a hydrogenation catalyst, comprising mixing rubber sulfiding auxiliary agents, olefin-containing components, elemental sulfur and hydrogenation catalysts together, wherein rubber sulfiding auxiliary agents promote the combination of elemental sulfur with olefin-containing components and reduce the lose of sulfur. However, said patent does not solve the problem of concentrative heat release during the activation. U.S. Pat. No. 6,059,956 (CN1076635C) describes introducing elemental sulfur and organic polysulfides into the catalyst in the presence of olefin- or olefin fraction-containing components such as vegetable oil, then activating with hydrogen, and finally passivating with oxygen-containing gas. Said patent states that the passivation improves the activity of catalyst. However, since the metals on the catalyst are still in sulfurization state, said patent still has the aforesaid same problems.

SUMMARY OF THE INVENTION

The present invention is put forward in view of the insufficiencies of the prior art, aiming to provide a hydrogenation catalyst composition, the process for preparing the same and the use thereof, wherein said hydrogenation catalyst composition contains a sulfiding agent and an organonitrogen substance. During the activation, the hydrogenation catalyst composition of the present invention not only homogeneously releases heat and has a high sulfur-maintaining ratio, but also improves the performances of the catalyst, such as activity and the like.

The hydrogenation catalyst composition of the present invention comprises
(1) a hydrogenation catalyst;
(2) an organonitrogen compound containing 1-15 carbon atoms in an amount of 0.01%-20%, preferably 2.0%-10% by weight of the catalyst;
(3) a sulfiding agent which is one or more selected from the group consisting of elemental sulfur, organic sulfide and inorganic sulfides, and preferably elemental sulfur, wherein the sulfiding agent is in an amount of 30%-150%, preferably 55%-120%, most preferably 60%-105% by weight of the sulfur-requiring amount calculated theoretically of the hydrogenation catalyst; and
(4) an organic solvent in an amount of 0.1%-50%, preferably 2%-45%, most preferably 15%-30% by weight of the catalyst.

The hydrogenation catalyst may be the conventional one, such as hydrorefining catalyst, hydrotreating catalyst, hydrocracking catalyst and so on. Generally, the hydrogenation catalyst comprises refractory inorganic oxides as the support, such as alumina, silica, amorphous silica-alumina, titanium oxide, molecular sieve, and composite oxides or mixed oxides of several elements. The active metal component is usually selected from one or more metals of W, Mo, Ni and Co. And there may comprise auxiliary agents simultaneously. The selection and amount of the hydrogenation catalyst support, active metal component and auxiliary agent can be specifically determined on the basis of the actual requirements according to the common knowledge in the art. As for hydrocarbon hydrogenation catalysts, the hydrogenation metal components, based on oxides, generally are in an amount of 1%-90%, usually 3%-50% by weight of the catalyst. The theoretical sulfur-requiring amount of the hydrogenation catalyst is the amount of sulfur required for converting the metal components on the catalyst into sulfides ($Co_9S_8$, $MoS_2$, $Ni_3S_2$, $WS_2$ and so on).

The organonitrogen compound contains 1-15, preferably 2-10 carbon atoms, and it is selected from one or more substances of, for example, hydrocarbyl amines, alcohol amines and amino acids. Specifically, the organonitrogen compound is selected from one or more substances of ethylene diamine, ethanolamine, diethanolamine, triethanolamine, diisopropanolamine, triethylamine, 2-cyclohexanediamine, trimethylene diamine, triethylene diamine, triethylene tetramine, t-butylamine, dodecyl amine, trioctylamine, ammonium triisopropionate, N,N-diethyl ethanolamine, aminononanoic acid, amino acetic acid, nitrilotriacetic acid, N,N-diethyl hydroxylamine, N-methyl diethanolamine, hexamethylene tetramine, N,N-diisopropyl ethanolamine, acetanilide, N,N-dihydroxyethylaniline, glutamic acid, and other substance(s) having similar structures to said substances above. The organic compounds comprising simultaneously nitrogen and oxygen, such as amino acids, are preferred so as to be advantageous to improving the sulfur-maintaining ratio and solving the problem of concentrative exothermic phenomenon.

The organic solvent can be selected from the common organic solvents in the field, e.g. one or more substances of hydrocarbon oils and organic carboxylic esters. The hydrocarbon oils are selected from one or more substances of naphtha, gasoline, kerosene, diesel oil, white oil, lube base oil, distilled and vacuum heavy distillate oil, preferably hydrocarbon oils obtained by secondary processing, e.g. hydrocarbon oils obtained by catalytic cracking process, thermal cracking process and so on. Organic carboxylic esters are organic carboxylic esters containing from 6-60 carbon atoms, preferably fatty acid glycerides, such as sesame oil, safflower seed oil, corn oil, cottonseed oil, peanut oil, rape-seed oil, bean oil, walnut oil, coconut oil, olive oil, sunflower seed oil, lard oil, n-butyl acetate, propylene glycol acetate monomethyl ether, 1,4-butanediol diacrylate, isopropyl cyclohexanoate, hexamethylene-diisocyanate, triethyl phosphate, methyl phenylacetate, isobutyl phenylacetate, diisononyl terephthalate, dimethyl phthalate, diethyl phthalate, methyl o-hydroxybenzoate, and butyl p-hydroxybenzoate, and one or more other organic carboxylic esters in the class. Hydrocarbon oils and organic carboxylic esters may be used separately, or used in combination. If they are mixed together, the weight ratio of hydrocarbon oils to organic carboxylic esters may be 1:15-15:1. Preferably, they are mixed together since it is advantageous to solving the problem of concentrative exothermic phenomenon.

The catalyst composition may contain other additives, such as one or more substances selected from organic carboxylic acids, organic alcohols, organic ketones. For example, the catalyst composition may comprise organic carboxylic acids containing 2-25 carbon atoms, and said organic carboxylic acids are in an amount of 0.5%-15% by weight of the catalyst.

In addition, the organic sulfide may be one or more selected from sulfones, thiols, thioethers, thiocarboxylic acids, thirams and organic polysulfides, specifically one or more selected from dimethyl sulfide, thioacetic acid, tert-dodecyl mercaptan, mercaptoacetic acid, mercaptopropionic acid, mercaptoamino acid, mercaptoethanol and the like. The inorganic sulfides may be one or more selected from ammonium sulfide, ammonium hydrosulfide, carbon bisulfide, and the like.

The process for preparing the hydrogenation catalyst composition of the present invention comprises the steps of
(1) supporting the organonitrogen compounds, preferably containing oxygen and nitrogen simultaneously onto the hydrogenation catalyst in oxidation state, wherein the organonitrogen compounds are in an amount of 0.5%-20%, preferably 2.0%-10% by weight of the catalyst; and
(2) supporting the organic solvent and sulfiding agent onto the hydrogenation catalyst containing the organonitrogen compounds in step (1), wherein the sulfiding agent is in an amount of 30%-150%, preferably 55%-120%, most preferably 60%-105% by weight of the theoretical sulfur-requiring amount of the hydrogenation catalyst, and the organic solvent is in an amount of 0.1%-50%, preferably 2%-45%, most preferably 15%-30% by weight of the hydrogenation catalyst. Sulfiding agent-containing hydrogenation catalysts can be obtained by said process.

The optional step (3) is to heat-treat the sulfiding agent-containing hydrogenation catalyst obtained in said step (2) for 0-20 h, preferably 0.2-15 h at 100-130° C., then for 0.2-15 h at 130-180° C., and finally for 0-15 h, preferably 1-8 h at 180-300° C.

The organonitrogen compounds in step (1) can be supported with the impregnating method, or be directly introduced onto the hydrogenation catalyst. If the impregnating method is used, the organonitrogen compounds are formulated into an aqueous solution, ammonia solution or organic solution; the hydrogenation catalyst is impregnated into said solution, and then dried to remove water, ammonia or organic solvent to obtain the hydrogenation catalyst supported with the organonitrogen compounds. The concentration of the ammonia solution which is generally not limited is just sufficient to smoothly dissolve the selected substance, and the weight concentration thereof is usually 0.1%-25%. The organic solvent is an organic solvent having a relatively lower boiling point (e.g. lower than 100° C.) and being capable of dissolving said substance, such as ethanol, methanol, ether, benzene, carbon tetrachloride and the like, and is selected according to the common knowledge on the basis of the organic compounds to be dissolved. The drying is conducted at a temperature of 80-200° C., preferably 80-140° C. for 1-20 h, preferably 2-8 h. The impregnation method easily makes the organonitrogen compound homogeneously dispersing on hydrogenation catalyst, and is a preferable embodiment. Meanwhile, a suitable amount of sulfur-containing compounds capable of being dissolved in said substance or solution, e.g. ammonium sulfide, may be added therein, generally 0.01%-5% by weight of the total weight of the catalyst.

The theoretical sulfur-requiring amount of the hydrogenation catalyst mentioned in said step (2) is the amount of sulfur required for converting the metal components on the catalyst into sulfides ($Co_9S_8$, $MoS_2$, $Ni_3S_2$, $WS_2$ and so on). In said step (2), the organic solvent and sulfiding agent are supported by any process employed in the prior art, e.g. (1) firstly supporting the sulfiding agent onto the catalyst, then impregnating with the organic solvent; (2) dispersing the sulfiding agent into the organic solvent, and then introducing onto the catalyst; or (3) impregnating the catalyst with the organic solvent first, and then introducing the sulfiding agent.

The heat treatment in said step (3) is conducted to heat treat the hydrogenation catalyst in step (2) supported with the organonitrogen compounds, sulfiding agent and organic solvent under certain conditions. Said heat treatment may be conducted at an absolute pressure of 0.05-1 MPa, or generally at a normal pressure. In addition, said heat treatment may also be carried out in an inert gas environment, or in an oxygen atmosphere having an oxygen content of 0.1 v %-30 v %. A mobile atmosphere may also be used therein, but a forcing mobile atmosphere is generally not necessary. An immobile atmosphere or a naturally mobile atmosphere may also be used therein.

The sulfiding agent-containing hydrogenation catalyst composition of the present invention may be used for the hydrogenation of various materials, e.g. hydrorefining process, hydrocracking process and hydroupgrading process of hydrocarbons according to the properties of catalyst. The hydrogenating process comprises the steps of:

(A) loading the hydrogenation catalyst composition of the present invention into a reactor;
(B) activating the hydrogenation catalyst; and
(C) contacting a hydrocarbon oil and hydrogen with the hydrogenation catalyst under suitable conditions to hydrogenate the hydrocarbon oil.

The activation in step (B) is conducted under the conventional activation conditions of, generally, a pressure of 1-20 MPa, an hydrogen hourly space velocity of 100-30,000 $h^{-1}$, a rate of temperature rise of 5-100° C./h, a final temperature at the inlet of the reactor of 200-400° C., wherein said temperature is maintained for 2-36 h. In addition, one or more distillate oils from gasoline, kerosene and diesel oil may be added at any time during the activation, wherein the liquid hourly volume space velocity of the distillate oils is 0.2-20 $h^{-1}$, and the $H_2$/oil volume ratio is 100:1-2,000:1.

The hydrogenation in step (C) is carried out under the conventional hydrogenating conditions in the field, which are different from each other according to different reactions. Generally, it is conducted at a pressure of 1-20 MPa, a temperature of 100-450° C., an $H_2$/oil volume ratio of 50-3,000, and a liquid hourly volume space velocity of 0.1-30 $h^{-1}$. Said hydrocarbon oil may be various hydrocarbon oil, such as gasoline fraction, kerosene fraction, diesel oil fraction, vacuum gas oil or residual oil.

The introduction of the organonitrogen compound, organic solvent and sulfiding agent into the hydrogenation catalyst of the present invention could effectively solve the problem of low sulfur-maintaining ratio and concentrative heat release during the activation of the hydrogenation catalyst containing only the organic solvent and sulfiding agent. In addition, the application of the organic compounds containing oxygen and nitrogen simultaneously is more advantageous to improving the sulfur-maintaining ratio of the catalyst and slowing down the concentrative heat release, and has more prominent effects. The hydrogenation catalyst of the present invention can sufficiently increase the vulcanizing effects of the catalyst, so as to improve the hydrogenating properties of the catalyst, e.g. hydrodesulfiding activity, hydrodenitrifing activity, hydrosaturating performance and the like. The sulfiding agent-containing hydrogenation catalyst obtained the process of the present invention has no self-ignitenition, and is easily to be stored, transported and used. In addition, the catalyst composition of the present invention has the advantages of simple preparation procedure, low production cost and being suitable for large scale application.

During the ex situ presulfurization of the hydrogenation catalyst of the present invention, a small amount of the organonitrogen compound is supported onto the surface of the catalyst in oxidation state, and the sulfiding agent and organic solvent are then supported thereon, and the heat treatment is finally conducted. By experiments, it shows that the sulfiding agent-containing presulfurized catalyst obtained by such treatment has the performances of high sulfur-maintaining ratio, no concentrative heat release, and high catalytic property during the activation. The sulfiding agent is supported by the method of the present invention, i.e. impregnating the organic solvent first, and then the sulfiding agent, which may further solve the problems of low sulfur-maintaining ratio and concentrative exothermic phenomenon in the prior art. By the pre-heating after the sulfiding agent is supported, especially by step-wise heat treatment of the present invention, the sulfiding agent, organic solvent and metal oxides may form various states having different binding extent under different temperature zones, and the heat release temperature ranges of said different substance-binding states are different from each other during the activation so that the heat release of the catalyst during the activation is dispersed in a relatively broad scope, which effectively slows down the concentrative heat release and is advantageous to the activation and application of the catalyst.

After the pretreatment of the catalyst by the present invention, the performances of the catalyst is obviously superior to those of the catalyst sulfurized by using the in situ sulfiding process and treated by the processes in the prior art.

THE PREFERRED EMBODIMENTS OF THE INVENTION

In the following embodiments, some commercially available hydrogenation catalyst are presulfurized ex situ, which further explains the procedure and effect of the process of the present invention, but does not limit the scope of the present invention.

Example 1

The commercial hydrodesulfiding catalyst FH-5A (developed by Fushun Research Institute of Petroleum and Petrochemicals, and produced by Wenzhou Huahua Group Co.) was used, and the main components and properties can be found in Table 1.

The specific presulfurization comprises the steps of
1. homogeneously impregnating triethylamine onto the catalyst FH-5A in oxidation state, wherein triethylamine is in an amount of 9% by weight of the catalyst, to form a catalyst supported with thiethylamine;
2. dispersing the elemental sulfur in a solvent in which the volume ratio of catalytically cracked gasoline to rapeseed oil is 5:1, wherein the solvent is in an amount of 25% by weight of the catalyst, and the elemental sulfur is in an amount of 115% by weight of the sulfur-requiring amount calculated theoretically amount of the metal-containing catalyst; spraying the solvent, in which the elemental sulfur is dispersed, onto the catalyst supported with triethylamine in said step (1); and
3. treating the catalyst obtained in said step (2) at a normal pressure, an immobile air atmosphere, and a temperature of 165° C., to finally obtain the hydrorefining catalyst EPRES-1 containing the sulfiding agent.

Example 2

The catalyst in oxidation state was the same as that in Example 1, i.e. FH-5A. The specific presulfurization comprises the steps of
1. dissolving triethylamine and gluconic acid in a weight ratio of 5:1 in aqueous ammonia containing 10 wt % ammonia to obtain a solution, impregnating the catalyst in oxidation state with said solution, wherein said substances are in an amount of 7% by weight of the catalyst; drying at 120° C. for 5 h, to obtain a catalyst containing mixed organic additives;
2. dispersing the elemental sulfur in a solvent in which the volume ratio of vacuum gas oil to peanut oil is 1:3, wherein the solvent is in an amount of 30% by weight of the catalyst, and the elemental sulfur is in an amount of 90% by weight of the sulfur-requiring amount calculated theoretically of the metal-containing catalyst; spraying the solvent, in which the elemental sulfur is dispersed, onto the catalyst in said step (1); and
3. treating the catalyst obtained in said step (2) at a normal pressure, a mobile nitrogen atmosphere (wherein the nitrogen amount is 50 L/L catalyst·h) and a temperature of 140° C. for 4 h, and at a temperature of 270° C. for 2 h, to finally obtain the hydrorefining catalyst EPRES-2 containing the sulfiding agent.

Comparative Example 1

The hydrorefining catalyst C-EPRES-2 containing a sulfiding agent was prepared according to the process in Example 2, wherein said step (1) was cancelled, and step (2) was the same as said step (2). However, said catalyst contained no organonitrogen compounds.

Example 3

The catalyst in oxidation state was the same as that in Example 1, i.e. FH-5A. The specific presulfurization comprises the steps of
1. homogeneously impregnating the catalyst FH-5A in oxidation state into the aqueous solution of amino acetic acid (containing 4.0 wt % amino acetic acid), wherein the amino acetic acid is in an amount of 0.05% by weight of the catalyst; then drying at 110° C. for 4 h, evaporating water to obtain a catalyst supported with amino acetic acid;
2. introducing the melted elemental sulfur into the catalyst containing amino acetic acid in step (1), wherein the elemental sulfur is in an amount of 105% by weight of the theoretical sulfur-requiring amount of the catalyst; then adding into the mixture in which butyl acetate, methyl phenylacetate and catalytically cracked diesel oil are in a weight ratio of 1:1:8, wherein the mixture is in an amount of 40% by weight of the catalyst; and
3. treating the catalyst obtained in said step (2) at a normal pressure, an immobile air atmosphere and a temperature of 110° C. for 4 h, at a temperature of 165° C. for 4 h and at a temperature of 260° C. for 6 h, to finally obtain the hydrorefining catalyst EPRES-3 containing the sulfiding agent.

Example 4

The commercial hydrodesulfiding catalyst FH-DS (developed by Fushun Research Institute of Petroleum and Petrochemicals, and produced by Wenzhou Huahua Group Co.) was used, and the main components and properties could be found in Table 2.

The specific presulfurization comprises the steps of
1. homogeneously impregnating the catalyst FH-DS in oxidation state into the aqueous solution of amino acetic acid (containing 7.5 wt % amino acetic acid), wherein the amino acetic acid is in an amount of 9% by weight of the catalyst; then drying at 110° C. for 4 h, evaporating water to obtain a catalyst supported with amino acetic acid;
2. impregnating the catalyst containing organonitrogen compounds in step (1) with a mixture of peanut oil and lard oil in a weight ratio of 4:1, wherein the mixture is in an amount of 5% by weight of the catalyst; then introducing the sublimed elemental sulfur onto the catalyst in a sealed container, wherein the elemental sulfur is in an amount of 70% by weight of the theoretical sulfur-requiring amount of the catalyst; and 3. treating the catalyst obtained in said step (2) at a normal pressure, an immobile air atmosphere and a temperature of 115° C. for 20 min, at a temperature of 145° C. for 12 h and at a temperature of 270° C. for 2 h, to finally obtain the hydrorefining catalyst EPRES-4 containing the sulfiding agent.

Example 5

The catalyst in oxidation state was the same as that in Example 4, i.e. FH-DS. The specific presulfurization comprises the steps of 1. mixing butene dioic acid, t-butylamine and carboamide in a weight ratio of 1:4:1 together and preparing an aqueous solution thereof, impregnating the catalyst in oxidation state into the solution, wherein said substances are in an amount of 4.7% by weight of the catalyst; then drying at 110° C. for 7 h, evaporating water to obtain a catalyst containing mixed organic additives;
2. dispersing the elemental sulfur in a solvent in which kerosene and 1,4-butanediol diacrylate are in a volume ratio of 3:1, wherein the solvent is in an amount of 30% by weight of the catalyst, and the elemental sulfur is in an amount of 115% by weight of the theoretical sulfur-requiring amount of the metal-containing catalyst; then spraying the solvent, in which the elemental sulfur is dispersed, onto the catalyst in said step (1); and
3. treating the catalyst obtained in said step (2) at a normal pressure, an immobile air atmosphere and a temperature of 125° C. for 4 h, at a temperature of 165° C. for 6 h and at a temperature of 250° C. for 7 h, to finally obtain the hydrorefining catalyst EPRES-5 containing the sulfiding agent.

Example 6

The commercial catalyst 3996 (developed by Fushun Research Institute of Petroleum and Petrochemicals, and produced by the catalyst factory of Fushun Petrochemical) for hydrogenating heavy oils was used, and the main components and properties could be found in Table 3.

The specific presulfurization comprises the steps of 1. dissolving a mixture of triethanolamine and N,N-diethylaminoethanol in a weight ratio of 1:3 in an ammonia solution containing 6 wt % ammonia, wherein the solution comprises ammonium sulfide in an amount of 1.0% by weight of the catalyst; impregnating the catalyst in oxidation state with said solution, wherein the organonitrogen compound is in an amount of 2.0% by weight of the catalyst; then drying at 140° C. for 5 h, to obtain a catalyst containing mixed organonitrogen compounds;
2. impregnating the catalyst containing organonitrogen compounds in step (1) with a mixture in which peanut oil and lard oil are in a weight ratio of 4:1, wherein the mixture is in an amount of 2% by weight of the catalyst; then mixing with the solid powder of the elemental sulfur, wherein the elemental sulfur is in an amount of 75% by weight of sulfur-requiring amount calculated theoretically of the metal-containing catalyst; and
3. treating the catalyst obtained in said step (2) at a normal pressure, an immobile air atmosphere and a temperature of 125° C. for 30 min, at a temperature of 145° C. for 11 h and at a temperature of 270° C. for 3 h, to finally obtain EPRES-6 containing the sulfiding agent.

Example 7

The catalyst for hydrogenating heavy oils in Example 6 was used. The specific presulfurization comprises the steps of 1. dissolving triethylene diamine in ethanol, wherein the weight concentration thereof is 10%; spraying said solution onto the catalyst in oxidation state, wherein triethylene diamine is in an amount of 8% by weight of the catalyst; then drying at 175° C. for 5 h, to obtain a catalyst containing triethylene diamine;
2. impregnating the catalyst containing organonitrogen compounds in step (1) with a mixed solvent in which peanut oil and base lube oil No. 150 are in a weight ratio of 5:1, wherein the mixed solvent is in an amount of 15% by weight of the catalyst, and comprises tetramethylthiuram-disulfide in an amount of 0.5% by weight of the catalyst; then introducing the melted elemental sulfur onto the catalyst, wherein the elemental sulfur is in an amount of 90% by weight of the theoretical sulfur-requiring amount of the metal-containing catalyst; and
3. treating the catalyst obtained in said step (2) at an absolute pressure of 0.06 MPa, a naturally mobile air atmosphere and a temperature of 140° C. for 1 h and at a temperature of 260° C. for 5 h to finally obtain the hydrotreating catalyst EPRES-7 containing the sulfiding agent.

Example 8

The commercially hydrocracking catalyst 3974 (developed by Fushun Research Institute of Petroleum and Petrochemicals, and produced by the catalyst factory of Fushun Petrochemical) was used, and the main properties could be found in Table 4. The specific presulfurization comprises the steps of 1. dissolving a mixture of triethanolamine and N,N-diethylaminoethanol in a weight ratio of 1:1 in an ammonia solution containing 10 wt % ammonia; impregnating the catalyst in oxidation state with said solution, wherein the organonitrogen compound is in an amount of 2.5% by weight of the catalyst; then drying at 160° C. for 4 h, to obtain a catalyst containing mixed organonitrogen compounds;
2. impregnating the catalyst containing organonitrogen compounds in step (1) with a mixture in which hydrocracked diesel oil, peanut oil and lard oil are in a weight ratio of 7:2:1, wherein the mixture is in an amount of 2% by weight of the catalyst; then introducing the sublimed elemental sulfur onto the catalyst in a sealed container, wherein the elemental sulfur is in an amount of 90% by weight of the sulfur-requiring amount calculated theoretically of the metal-containing catalyst; and
3. treating the catalyst obtained in said step (2) at a normal pressure, an immobile air atmosphere containing 2 v % oxygen and a temperature of 120° C. for 2 h, at a temperature of 150° C. for 2 h, at a temperature of 190° C. for 3 h and at a temperature of 240° C. for 4 h, to finally obtain the hydrocracking catalyst EPRES-8 containing the sulfiding agent.

Example 9

The commercial hydrodesulfiding catalyst FH-DS (developed by Fushun Research Institute of Petroleum and Petrochemicals, and produced by Wenzhou Huahua Group Co.) was used. The main components and properties can be found in Table 2. The specific presulfurization comprises the steps of 1. homogeneously impregnating the catalyst FH-DS in oxidation state into the aqueous solution of amino acetic acid (containing 7.5 wt % amino acetic acid), wherein the amino acetic acid is in an amount of 9% by weight of the catalyst; then drying at 110° C. for 4 h, evaporating water to obtain a catalyst supported with amino acetic acid;
2. dissolving carbon disulfide in a mixed organic solvent containing peanut oil and catalytically cracked diesel oil in a weight ratio of 15:1; impregnating the catalyst containing organonitrogen compounds in step (1) with said solution, wherein the mixed organic solvent is in an amount of 30% by weight of the catalyst, and carbon bisulfide is in an amount of 95% by weight of the sulfur-requiring amount calculated theoretically of the metal-containing catalyst; and
3. treating the catalyst obtained in said step (2) at a normal pressure, an immobile air atmosphere and a temperature of 115° C. for 20 min, at a temperature of 145° C. for 12 h and at a temperature of 270° C. for 2 h, to finally obtain the hydrorefining catalyst EPRES-9 containing the sulfiding agent.

Example 10

By the process in Example 9 except that carbon bisulfide was replaced with a mixed sulfiding agent in which dimethyl sulfide and thioacetic acid were in a weight ratio of 1:2, the hydrorefining catalyst EPRES-10 containing the sulfiding agent was obtained.

Example 11

The process in Example 9 was used, except that step (2) was replaced with the step of dispersing ammonium sulfide in catalytically cracked diesel oil, impregnating the catalyst containing organonitrogen compounds in step (1), wherein the catalytically cracked diesel oil was in an amount of 40% by weight of the catalyst, and ammonium sulfide was in an amount of 105% by weight of the theoretical sulfur-requiring amount of the metal-containing catalyst.

Other steps and conditions were the same as those in Example 9, so as to obtain the hydrorefining catalyst EPRES-11 containing the sulfiding agent.

The sulfiding agent-containing hydrogenation catalysts obtained in said examples and comparative examples were assayed for the sulfur-maintaining ratio and activated, wherein the assay for the sulfur-maintaining ratio was conducted at a pressure of 5.0 MPa, a temperature of 150° C., an $H_2$/diesel oil volume ratio of 400 (see Table 6 for the properties), a liquid hourly volume space velocity of 3.5 $h^{-1}$, wherein said temperature was maintained for 6 h. The sulfur-maintaining ratio was the weight percent of the sulfur maintained after said treatment to that of the initial sulfur (see Table 5 for the specific results).

Figure 1:
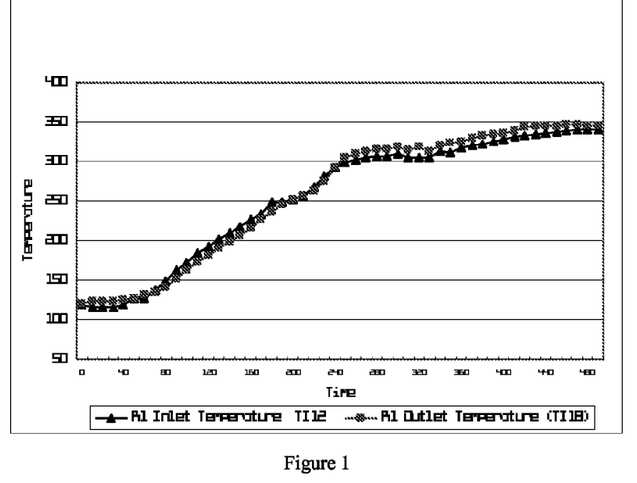
FIG. 1 represents the temperature difference curve of the inlet and the outlet of the catalyst bed layer during the activation of the sulfiding agent-containing hydrogenation catalyst EPRES-2 obtained in Example 2 of the present invention.
Figure 2:
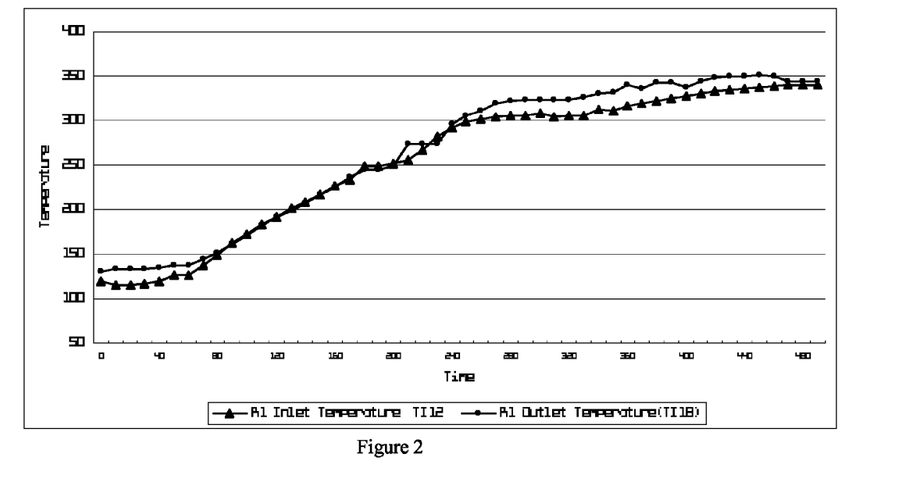
FIG. 2 represents the temperature difference curve of the inlet and the outlet of the catalyst bed layer during the activation of the sulfiding agent-containing hydrogenation catalyst C-EPRES-2 obtained in Comparative Example 1.

The procedures for the activation of the sulfiding agent-containing hydrogenation catalysts obtained in said examples and comparative examples comprised carrying out in a fixed-bed reactor, the catalyst bed layer having a height of 800 mm, and the activation conditions could be found in Table 7. The results of the maximum temperature rise at the outlet and inlet of the bed layer during the activation of various sulfur-containing catalysts could be found in Table 8. The inlet and outlet temperature curves of the catalyst EPRES-2 during the temperature rise could be found in FIG. 1, and the inlet and outlet temperature curves of the catalyst C-EPRES-2 in the comparative examples during the temperature rise could be found in FIG. 2. In addition, the results of and C-EPRES-2 for hydrogenation of diesel oil fraction could be found in Table 9.

TABLE 1

Main components and properties of
FH-5A hydrodesulfurization catalyst

| Catalyst | FH-5A in oxidation state |
|---|---|
| Support | $Al_2O_3$ |
| Active metal components, wt % | |
| $MoO_3$ | 24.3 |
| NiO | 4.2 |
| Auxiliary agent $SiO_2$, wt % | 10.1 |
| Pore volume, ml · $g^{-1}$ | 0.4 |
| Specific surface area, $m^2 · g^{-1}$ | 190 |

TABLE 2

Main components and properties of
FH-DS hydrodesulfurization catalyst

| Catalyst | FH-DS in oxidation state |
|---|---|
| Support | $Al_2O_3$ |
| Active metal components, wt % | |
| $WO_3$ | 19.3 |
| $MoO_3$ | 6.7 |
| NiO | 2.2 |
| CoO | 3.4 |
| Pore volume, ml · $g^{-1}$ | 0.32 |
| Specific surface area, $m^2 · g^{-1}$ | 170 |

TABLE 3

Main components and properties of the catalyst
3996 for hydrotreating heavy oils

| Catalyst | 3996 in oxidation state |
|---|---|
| Support | $Al_2O_3$ |
| Active metal components, wt % | |
| $MoO_3$ | 23.9 |
| NiO | 4.2 |
| Auxiliary agent $P_2O_5$, wt % | 3.8 |
| Pore volume, ml · $g^{-1}$ | 0.35 |
| Specific surface area, $m^2 · g^{-1}$ | 173 |

TABLE 4

Main properties and components of hydrocracking catalyst 3974

| Catalyst | 3974 in oxidation state |
|---|---|
| Support, wt % | |
| $Al_2O_3$ | balance |
| Amorphous silica-alumina containing 40 wt % of $SiO_2$ | 35 |
| Modified Y molecular sieve (wherein the molar ratio of $SiO_2/Al_2O_3$ is 13) | 15 |
| Active metal components, wt % | |
| $WO_3$ | 28.2 |
| NiO | 4.2 |

TABLE 4-continued

Main properties and components of hydrocracking catalyst 3974

| Catalyst | 3974 in oxidation state |
|---|---|
| Pore volume, ml · g$^{-1}$ | 0.40 |
| Specific surface area, m$^2$ · g$^{-1}$ | 240 |

TABLE 5

Sulfur-maintaining ratio of the sulfiding agent-containing hydrogenation catalyst in the Examples and Comparative Examples

| Serial No. | Sulfur-containing catalysts | Sulfur-maintaining ratio, % |
|---|---|---|
| Example 1 | EPRES-1 | 62.9 |
| Example 2 | EPRES-2 | 68.5 |
| Comparative Example 1 | C-EPRES-2 | 52.6 |
| Example 3 | EPRES-3 | 78.1 |
| Example 4 | EPRES-4 | 74.2 |
| Example 5 | EPRES-5 | 67.8 |
| Example 6 | EPRES-6 | 76.9 |
| Example 7 | EPRES-7 | 71.8 |
| Example 8 | EPRES-8 | 75.2 |
| Example 9 | EPRES-9 | 85.7 |
| Example 10 | EPRES-10 | 89.4 |
| Example 11 | EPRES-11 | 76.9 |

TABLE 6

Properties of diesel oil used for sulfur-maintaining ratio assay and activation

| Raw oils | Diesel oil | Gasoline |
|---|---|---|
| Density (20° C.), kg · m$^{-3}$ | 830.5 | 723.2 |
| Final boiling point (20° C.) | 352 | 165 |
| Sulfur, μg · g$^{-1}$ | 687 | 105 |
| Nitrogen, μg · g$^{-1}$ | 116.7 | 1.4 |
| Acidity, mgKOH · (100 mL)$^{-1}$ | 5.53 | / |

TABLE 7

Conditions for the activtion of the sulfiding agent-containing hydrogenation catalysts in the Examples and Comparative Examples

| Examples No. | Activation materials | Pressure (MPa)/ratio of hydrogen to oil/ liquid hourly space velocity (h$^{-1}$) | Rate of temperature rise (° C./h) | Finally risen temperature (° C.) | Time of maintaining constant temperature |
|---|---|---|---|---|---|
| Example 1 | Gasoline | 2/300/1 | 10 | 220 | 5 |
| Example 2 | Diesel oil | 6/500/3 | 30 | 300 | 12 |
| Comparative Example 1 | Diesel oil | 6/500/3 | 30 | 300 | 12 |
| Example 3 | Diesel oil | 6/800/2 | 60 | 320 | 24 |
| Example 4 | Diesel oil | 8/800/2 | 80 | 320 | 18 |
| Example 5 | Diesel oil | 8/800/2 | 50 | 280 | 18 |
| Example 6 | Diesel oil | 15/1200/5 | 40 | 280 | 24 |
| Example 7 | Diesel oil | 15/1200/7 | 30 | 300 | 24 |
| Example 8 | / | 15/25000 (H$_2$ volume flow rate, h$^{-1}$) | 60 | 350 | 3 |
| Example 9 | Diesel oil | 8/800/2 | 90 | 350 | 15 |
| Example 10 | Diesel oil | 8/800/2 | 90 | 340 | 12 |
| Example 11 | Diesel oil | 8/800/2 | 40 | 280 | 35 |

TABLE 8

Maximum temperature rise of the bed layer during the activation of the sulfiding agent-containing hydrogenation catalysts in the Examples and Comparative Examples

| Serial No. | Sulfur-containing catalyst | Maximum temperature rise of the bed layer during the activation, ° C. |
|---|---|---|
| Example 1 | EPRES-1 | 14 |
| Example 2 | EPRES-2 | 12 |
| Comparative Example 1 | C-EPRES-2 | 24 |
| Example 3 | EPRES-3 | 12 |
| Example 4 | EPRES-4 | 12 |
| Example 5 | EPRES-5 | 11 |
| Example 6 | EPRES-6 | 9 |
| Example 7 | EPRES-7 | 11 |
| Example 8 | EPRES-8 | 11 |
| Example 9 | EPRES-9 | 9 |
| Example 10 | EPRES-10 | 8 |
| Example 11 | EPRES-11 | 12 |

TABLE 9

Conditions and results of EPRES-2 and C-EPRES-2 for hydrogenating diesel oil fraction

| Catalysts | | EPRES-2 | C-EPRES-2 |
|---|---|---|---|
| Feedstocks and products | Hydro- cracked diesel oil | Refined oil | |
| Reaction temperature, ° C. | | 340 | 340 |
| Reaction pressure, MPa | | 6.0 | 6.0 |
| Hydrogen/oil ratio | | 350 | 350 |
| Liquid hourly space velocity, h$^{-1}$ | | 3.0 | 3.0 |
| Density (20° C.), g · cm$^{-3}$ | 0.9334 | 0.9420 | 0.9458 |
| Final boiling point, ° C. | 355 | 354 | 353 |
| Sulfur, μg · g$^{-1}$ | 10766 | 1052 | 3284 |
| Nitrogen, μg · g$^{-1}$ | 767 | 80.5 | 127.0 |

Example 12

The processing conditions and results of EPRES-1 for hydrorefining gasoline fraction are shown in Table 10.

TABLE 10

Conditions and results of EPRES-1 for hydrorefining gasoline fraction

| Catalyst | EPRES-1 | |
|---|---|---|
| Feedstock and products | Distilled gasoline | Refined oil |
| Reaction temperature, °C. | | 260 |
| Reaction pressure, MPa | | 2.0 |
| Hydrogen/oil ratio | | 150 |
| Liquid hourly space velocity, h$^{-1}$ | | 18 |
| Density (20° C.), g·cm$^{-3}$ | 0.7232 | 0.7183 |
| Sulfur, μg·g$^{-1}$ | 105 | <0.5 |
| Nitrogen, μg·g$^{-1}$ | 1.4 | <0.5 |

Example 13

The processing conditions and results of EPRES-3, EPRES-4 and EPRES-5 for hydrorefining diesel oil fraction are shown in Table 11.

TABLE 11

Conditions and results of EPRES-3, EPRES-4 and EPRES-5 for hydrorefining diesel oil fraction

| | Catalysts | | | | |
|---|---|---|---|---|---|
| | EPRES-3 | | EPRES-4 | | EPRES-5 |
| | Feedstock and products | | | | |
| | Coked oil | Refined oil | Mixed diesel oil | Refined oil | Catalyzed oil | Refined oil |
| Reaction temperature, °C. | | 350 | | 340 | | 370 |
| Reaction pressure, MPa | | 6.0 | | 8.0 | | 6.0 |
| Hydrogen/oil ratio | | 800 | | 1000 | | 1200 |
| Liquid hourly space velocity, h$^{-1}$ | | 3.0 | | 2.5 | | 2.0 |
| Density (20° C.), g·cm$^{-3}$ | 0.8185 | 0.7911 | 0.8516 | 0.8275 | 0.9022 | 0.8674 |
| Distillation range, °C. | 178-365 | 170-360 | 181-370 | 173-365 | 167-363 | 148-359 |
| Sulfur, μg·g$^{-1}$ | 846 | 25 | 9200 | 12 | 10530 | 11 |
| Nitrogen, μg·g$^{-1}$ | 1102 | 37 | 285 | <1 | 909 | 12 |

Example 14

The processing conditions and results of EPRES-6 and EPRES-7 for hydrorefining vacuum gas oil are shown in Table 12.

TABLE 12

Conditions and results of EPRES-6 and EPRES-7 for hydrogenating vacuum gas oil (VGO)

| Catalysts | | EPRES-6 | EPRES-7 |
|---|---|---|---|
| Feedstocks and products | VGO | Refined oil | Refined oil |
| Reaction temperature, °C. | | 370 | 390 |
| Reaction pressure, MPa | | 15 | 15 |
| Hydrogen/oil ratio | | 1500 | 1500 |
| Liquid hourly space velocity, h$^{-1}$ | | 1.0 | 2.0 |
| Density (20° C.), g·cm$^{-3}$ | 0.9021 | 0.8970 | 0.8970 |
| Distillation range, °C. | 281-538 | 274-530 | 274-530 |
| Sulfur, μg·g$^{-1}$ | 15500 | 2.0 | 1.8 |
| Nitrogen, μg·g$^{-1}$ | 13880 | 3.2 | 3.1 |

Example 15

The processing conditions and results of EPRES-8 for hydrocracking vacuum gas oil were shown in Table 13. Said vacuum gas oil had a distillation range of 352-535° C., a sulfur-content of 1.95 wt %, a nitrogen-content of 1280 μg/g. Said vacuum gas oil was firstly hydrorefined with EPRES-7 to an extent of a nitrogen-content less than 5 μg/g, and then hydrocracked.

TABLE 13

Conditions and results of EPRES-8 for hydrocracking vacuum gas oil

| Catalyst | EPRES-8 |
|---|---|
| Operating conditions | |
| Reaction temperature, °C. | 375 |
| Reaction pressure, MPa | 15 |
| Hydrogen/oil ratio | 3000 |
| Liquid hourly space velocity, h$^{-1}$ | 1.5 |
| Yields and properties of main products | |
| Yield of aviation kerosene (177-282° C.), wt % | 20.2 |
| Smoke point of aviation kerosene, mm | 30 |
| Yield of diesel oil (282-370° C.), wt % | 35.1 |

TABLE 13-continued

Conditions and results of EPRES-8 for hydrocracking vacuum gas oil

| Catalyst | EPRES-8 |
|---|---|
| Cetane value of diesel oil | 61 |
| Yield of tail oil (>370° C.), wt % | 31.2 |
| BMCI value of tail oil | 6.5 |

Example 16

The processing conditions and results of EPRES-9, EPRES-10 and EPRES-11 for hydrorefining diesel oil fraction were shown in Table 14.

TABLE 14

Conditions and results of EPRES-9, EPRES-10 and EPRES-11 for hydrorefining diesel oil fraction

| | Catalysts | | | | | |
|---|---|---|---|---|---|---|
| | EPRES-9 | | EPRES-10 | | EPRES-11 | |
| | Feedstocks and products | | | | | |
| | Coked oil | Refined oil | Mixed diesel oil | Refined oil | Catalyzed oil | Refined oil |
| Reaction temperature, ° C. | | 350 | | 340 | | 370 |
| Reaction pressure, MPa | | 6.0 | | 8.0 | | 6.0 |
| Hydrogen/oil ratio | | 800 | | 1000 | | 1200 |
| Liquid hourly space velocity, h$^{-1}$ | | 3.0 | | 2.5 | | 2.0 |
| Density (20° C.), g·cm$^{-3}$ | 0.8185 | 0.7902 | 0.8516 | 0.8273 | 0.9022 | 0.8670 |
| Distillation range, ° C. | 178-365 | 170-360 | 181-370 | 173-365 | 167-363 | 148-359 |
| Sulfur, µg·$^{-1}$ | 846 | 12 | 9200 | 12 | 10530 | 11 |
| Nitrogen, µg·g$^{-1}$ | 1102 | <1 | 285 | <1 | 909 | <1 |

The invention claimed is:

1. A hydrogenation catalyst composition, comprising:
   (1) a hydrogenation catalyst;
   (2) an organonitrogen compound containing 1-15 carbon atoms, which is in an amount of 0.01%-20% by weight of the hydrogenation catalyst;
   (3) a sulfiding agent; and
   (4) an organic solvent, which is in an amount of 0.1%-50% by weight of the hydrogenation catalyst,
   wherein said organonitrogen compound is selected from one or more substances of hydrocarbyl amines, alcohol amines and amino acids, and wherein the organonitrogen compound, the sulfiding agent, and the organic solvent are simultaneously supported on the hydrogenation catalyst.

2. The composition according to claim 1, characterized in that the sulfiding agent is selected from the group consisting of an elemental sulfur, organic sulfides, inorganic sulfides, and mixtures thereof.

3. The composition according to claim 1, characterized in that the sulfiding agent is in an amount of 30%-150% by weight of a theoretical sulfur-requiring amount of the hydrogenation catalyst; and the organic solvent is in an amount of 0.1%-50% by weight of the hydrogenation catalyst.

4. The composition according to claim 1, characterized in that the organonitrogen compound is in an amount of 2.0%-10% by weight of the hydrogenation catalyst; the sulfiding agent is in an amount of 55%-120% by weight of the theoretical sulfur-requiring amount of the hydrogenation catalyst; and the organic solvent is in an amount of 15%-30% by weight of the hydrogenation catalyst.

5. The composition according to claim 1, characterized in that the hydrogenation catalyst comprises refractory inorganic oxides as the support, and one or more metals selected from the group consisting of W, Mo, Ni and Co as active metal components.

6. The composition according to claim 1, characterized in that the organonitrogen compound contains 2-10 carbon atoms.

7. The composition according to claim 1, characterized in that the organonitrogen compound is an amino acid substance.

8. The composition according to claim 1, characterized in that the organonitrogen compound is selected from one or more substances of ethylene diamine, ethanolamine, diethanolamine, triethanolamine, diisopropanolamine, triethylamine, 2-cyclohexanediamine, trimethylene diamine, triethylene diamine, triethylene tetramine, t-butylamine, dodecyl amine, trioctylamine, ammonium tri-isopropionate, N,N-diethyl ethanolamine, aminononanoic acid, amino acetic acid, nitrilotriacetic acid, N,N-diethyl hydroxylamine, N-methyl diethanolamine, hexamethylene tetramine, N,N-diisopropyl ethanolamine, acetanilide, N,N-dihydroxyethylaniline, glutamic acid, and other substance(s) having similar structures to said substances above.

9. The composition according to claim 1, characterized in that the organonitrogen compound is an organic substance simultaneously containing nitrogen and oxygen.

10. The composition according to claim 1, characterized in that the organic solvent is selected from one or more substances of hydrocarbon oils and organic carboxylic esters.

11. The composition according to claim 10, characterized in that the hydrocarbon oils are selected from one or more substances of naphtha, gasoline, kerosene, diesel oil, white oil, lube base oil, distilled and vacuum heavy distillate oil; and the organic carboxylic esters are organic carboxylic esters containing 6-60 carbon atoms.

12. The composition according to claim 10, characterized in that the hydrocarbon oils are obtained by a catalytic cracking process or a thermal cracking process; and the organic carboxylic esters are selected from one or more substances of sesame oil, safflower seed oil, corn oil, cottonseed oil, peanut oil, rape-seed oil, bean oil, walnut oil, coconut oil, olive oil, sunflower seed oil, lard oil, n-butyl acetate, propylene glycol acetate monomethyl ether, 1,4-butanediol diacrylate, isopropyl cyclohexanoate, hexamethylene-diisocyanate, triethyl phosphate, methyl phenylacetate, isobutyl phenylacetate, diisononyl terephthalate, dimethyl phthalate, diethyl phthalate, methyl o-hydroxybenzoate, and butyl p-hydroxybenzoate.

13. The composition according to claim 10, characterized in that organic solvent comprises hydrocarbon oils and organic carboxylic esters that are mixed in a weight ratio of 1:15-15:1.

14. A process for preparing a hydrogenation catalyst composition, comprising the steps of:
   (1) introducing an organonitrogen compound onto the hydrogenation catalyst wherein the organonitrogen compound is in an amount of 0.01%-20% by weight of the hydrogenation catalyst; and
   (2) introducing an organic solvent in an amount of 0.1%-50% by weight of the hydrogenation catalyst and a sulfiding agent onto the hydrogenation catalyst containing the organonitrogen compound obtained in step (1), so that the organonitrogen compound, the sulfiding agent, and the organic solvent are simultaneously supported on the hydrogenation catalyst.

15. The process according to claim 14, characterized in that the sulfiding agent is selected from the group consisting of an elemental sulfur, organic sulfides, inorganic sulfides, and mixtures thereof.

16. The process according to claim 14, characterized in that the sulfiding agent is in an amount of 30%-150% by weight of the theoretical sulfur-requiring amount of the hydrogenation catalyst; and the organic solvent is in an amount of 0.1%-50% by weight of the hydrogenation catalyst.

17. The process according to claim 14, characterized in that the catalyst composition obtained in step (2) is heat-treated.

18. The process according to claim 17, characterized in that the catalyst composition is heat-treated for 0-20 h at 100-130° C., then for 0.2-15 h at 130-180° C., and then for 0-15 h at 180-300° C.

19. The process according to claim 18, characterized in that the heat-treatment lasts 0.2-15 h at 100-130° C., then for 0.2-15 h at 130-180° C., and then for 1-8 h at 180-300° C.

20. The process according to claim 14, characterized in that the organonitrogen compound in step (1) is introduced by an impregnating method comprising the step of formulating an aqueous solution, ammonia solution or organic solution with the organonitrogen compound, and the step of impregnating the hydrogenation catalyst, and then the step of drying to remove water, ammonia or organic solvent to obtain the hydrogenation catalyst supported with the organonitrogen compound; or by directly introducing the organonitrogen compound onto the hydrogenation catalyst.

21. The process according to claim 14, characterized in that the organic solvent and the sulfiding agent in step (2) are introduced by (1) firstly supporting the sulfiding agent onto the catalyst, then impregnating with the organic solvent; (2) dispersing the sulfiding agent into the organic solvent, and then introducing onto the catalyst; or (3) impregnating the catalyst with the organic solvent first, and then introducing the sulfiding agent.

22. A hydrogenating process, comprising the steps of:
   (A) feeding the hydrogenation catalyst composition of claim 1 into a reactor;
   (B) activating the hydrogenation catalyst composition; and
   (C) contacting a hydrocarbon oil with the catalyst composition resulting from Step (B) under suitable conditions to hydrogenate the hydrocarbon oil.

23. The process according to claim 22, characterized in that the hydrogenation process is selected from an hydrorefining process, an hydrocracking process, and an hydro-upgrading process of hydrocarbons.

24. The process according to claim 22, characterized in that the activation in step (B) is conducted at a pressure of 1-20 MPa, an $H_2$ space velocity of 100-30,000 $h^{-1}$, a rate of temperature rise of 5-100° C./h, wherein a final temperature at the inlet of the reactor ranges from 200-400° C., and said final temperature is maintained for 2-36 h.

25. The process according to claim 24, characterized in that one or more distillate oils selected from gasoline, kerosene and diesel oil are added during the activation, wherein the liquid hourly space velocity of the distillate oils is 0.2-20 $h^{-1}$, and the $H_2$/oil volume ratio is 100:1-2,000:1.

26. The process according to claim 22, characterized in that the hydrogenation in step (C) is carried out at a pressure of 1-20 MPa, a temperature of 100-450° C., an $H_2$/oil volume ratio of 50-3,000, and a liquid hourly space velocity of 0.1-30 $h^{-1}$.

27. A hydrogenation process comprising contacting a hydrocarbon oil with the hydrogenation catalyst of claim 1 under hydrogenation conditions, wherein the hydrogenation conditions are selected from conditions for hydrorefining, hydrocracking, and hydro-upgrading hydrocarbons.

* * * * *